(12) United States Patent
Kawase (10) Patent No.: US 6,438,631 B1
(45) Date of Patent: Aug. 20, 2002

(54) RECORDING DEVICE, INTERFACE CARD FOR USING THE SAME, AND METHOD FOR SENDING RECORDING DATA FROM A HOST COMPUTER TO THE RECORDING DEVICE

(75) Inventor: Yuji Kawase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/454,176

(22) Filed: Dec. 2, 1999

(30) Foreign Application Priority Data

Dec. 3, 1998 (JP) ............................. 10-344253

(51) Int. Cl.[7] ............................................. G06E 13/12
(52) U.S. Cl. ......................... 710/68; 707/101; 709/247
(58) Field of Search ........................ 710/68; 707/101; 709/247; 375/240.28; 348/524

(56) References Cited

U.S. PATENT DOCUMENTS

| 5,463,772 A | | 10/1995 | Thompson et al. | ......... 707/101 |
| 5,537,551 A | * | 7/1996 | Denenberg et al. | ........... 341/55 |
| 5,844,608 A | * | 12/1998 | Yu et al. | ............... 375/240.01 |
| 5,968,149 A | * | 10/1999 | Jaquette et al. | ............... 710/1 |
| 6,310,922 B1 | * | 10/2001 | Canfield et al. | ............. 348/524 |
| 6,330,363 B1 | * | 12/2001 | Accad | ......................... 382/232 |

FOREIGN PATENT DOCUMENTS

| GB | 2 292 820 | 3/1996 |
| JP | 7-144441 | 6/1995 |
| JP | 8-164640 | 6/1996 |

\* cited by examiner

Primary Examiner—Jeffrey Gaffin
Assistant Examiner—Harold Kim
(74) Attorney, Agent, or Firm—Mark P. Watson (57) ABSTRACT

Compression-decompression functions provided in the recording device are easily replaceable so that they conform with the compression-decompression function provided in the host computer. A recording device 10 connected with a host computer 20 for operation based on commands from the host computer 20 comprises a interface card 12 mounted in the recording device 10 replaceably with respect to the control board 11 for exchanging data with the host computer 20. A first data decompressor 30 is included in the interface card 12 for decompressing compressed data to be exchanged between the host computer 20 and recording device 10. This allows selection and replacement of decompression function in the recording device in conformance with the compression algorithm in the host computer without replacing the recording device as a whole.

14 Claims, 6 Drawing Sheets

RECORDING DEVICE, INTERFACE CARD FOR USING THE SAME, AND METHOD FOR SENDING RECORDING DATA FROM A HOST COMPUTER TO THE RECORDING DEVICE

BACKGROUND OF THE INVENTION

1. Field of the Invention

The present invention relates to a recording device, such as a printer, connected to a host computer to perform operations based on commands from the host computer, and a method for sending recording data from a host computer to the recording device. Particularly, it relates to an interface card detachably mounted in the recording device. The interface card performs data compression and data transfer between the host computer and the recording device.

2. Description of the Related Art

The amount of data exchanged between a host computer and a recording device has been steadily increasing. This is due in part to a higher density of data in recording or printing, an increased number of colors being expressed in the recording or printing output, and an increased variety of recording or printing modes. However, strong demand still exists for higher speeds in recording or printing processes, which requires technologies supporting high speed data transfer.

The amount of data transferred per unit time has been increasing as a result of higher speed data processing in the host computer and recording device. However, the transfer rate will be limited as long as present interfaces widely employed in recording devices (such as RS232C or Centronics) are used.

Under such circumstances, an effective method for decreasing the amount of data to be transferred is for the sender (for example, a host computer) to compress the data with a predetermined algorithm and for the receiver (for example, a recording device) to decompress (restore) the data to its original form.

Incidentally, a printer having an interface card detachably mounted in the printer is well known. Various interface cards correspond to various interfaces between the various host computers and recording devices, such as RS232C, Centronics or USB (Universal Serial Bus). Accordingly, by replacing the interface card, it is possible to be compatible with the various interfaces.

For example, JP-A-8-164640 discloses a print system in which host computers are connected through a network to a printer via a network board connected to the printer. In this print system, the network board has a data decompression control area for decompressing compressed printing data sent from host computers.

However, in a case of communication between a host computer and a recording device using such compressed data, it is required that the receiver decompress the data with the same algorithm as that used by the sender for compression. This requires that the data compression/decompression function provided in the host computer must be the same as that provided in the recording device.

Accordingly, the compression/decompression functions in the recording device must be compatible with the compression/decompression function in the particular host computer that is being used with the recording device.

If any one of the host computer, the interface card or the recording device in use is replaced, or the compression/decompression algorithm is replaced with another algorithm, a problem may arise in which the exchange of compressed data between the host computer and the recording device becomes impossible, or the transfer rate or processing speed become lower.

In addition, if each of the recording device and the interface card has its own compression/decompression function, in order to decrease the time required for data processing, it must determined which of the compression/decompression functions is best for exchanging the compressed data with the host computer.

OBJECTS OF THE INVENTION

Therefore, it is an object of the present invention to overcome the aforementioned problems.

An object of the present invention is to provide a solution to the above problem by making the compression/decompression function provided in the recording device easily replaceable so that it is compatible with the compression/decompression function provided in the host computer. Another object is to provide compatibility with a host computer having various compression/decompression functions.

SUMMARY OF THE INVENTION

To accomplish the above objects, an interface for communication with a host computer is formed as a card (interface card) in the recording device of the present invention so that it can be replaced independently of the recording device. Specifically, the interface card is detachably connected to a control board, which is mounted in the recording device and has a first controller for controlling the recording device.

A first decompressor for decompressing compressed data received from the host computer is provided in the interface card. This allows selection and replacement of the decompression function in the recording device so that it is compatible with the compression algorithm in the host computer without replacing the recording device as a whole.

A second controller is also provided in the interface card. The second controller allows the first decompressor to decompress the compressed data by comparing data processing performances for decompressing the compressed data between the control board and the interface card.

Furthermore, the present invention may include a control board including a second decompressor capable of decompressing compressed data. The second controller allows either one of the first and second decompressors to decompress the compressed data by first comparing the performances between the control board and the interface card.

This allows a reduction in the time required for data processing by decompressing the compressed data with the decompressor that is more favorable for data decompression performance.

The present invention may include a first compressor provided on the interface card. The first compressor can compress data for communicating with the host computer.

Also, the present invention may include a second compressor mounted in the above recording device and provided on the control board. The second compressor can compress data for communicating with the host computer. In such configuration, the second controller allows either one of said first and second compressors to compress the data, by comparing data processing performances between said control board and said interface card.

This allows a reduction in the time required for data processing by compressing the data using the compressor that is more favorable for data compression performance when the compressed data is sent to the host computer.

Furthermore, in the present invention it is preferable that a plurality of different algorithms for decompressing or compressing the data be provided with each of the first decompressor and the first compressor.

Also, the present invention is directed to a method for sending recording data from a host computer to a recording device. This method is preferably executed under a recording system, in which an interface card, having a first decompressor, is detachably connected to a control board mounted in the recording device, and the host computer communicates with the control board via the interface card.

The method comprises following steps.

(a) determining an algorithm for compressing/decompressing recording data that is available for the host computer and for at least one of the interface card and the control board, (b) enabling the first decompressor if the control board has no decompressor that can decompress compressed data in accordance with the algorithm determined in the step (a), (c) if the control board has a second decompressor that can decompress the compressed data, comparing data processing performances for decompressing the compressed data between the control board and the interface card, (d) in accordance with the result of step (c), enabling either one of the first and second decompressors, (e) compressing the record data in the host computer in accordance with the algorithm determined in the step (a), and sending the compressed data to the interface card;

(f) if the first decompressor is enabled, decompressing the compressed data in the interface card, and sending the decompressed data to the control board; and (g) if the first decompressor is disabled, passing the compressed data to the control board; and decompressing the compressed data therein.

The present invention further includes a software program for implementing the method for sending and receiving recording data of the present invention. The software program may be stand-alone, resident on the host computer, recorded on a medium or media readable by the host computer or recording device or embodied in a carrier wave that can be input to the host computer or recording device.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Figure 1:
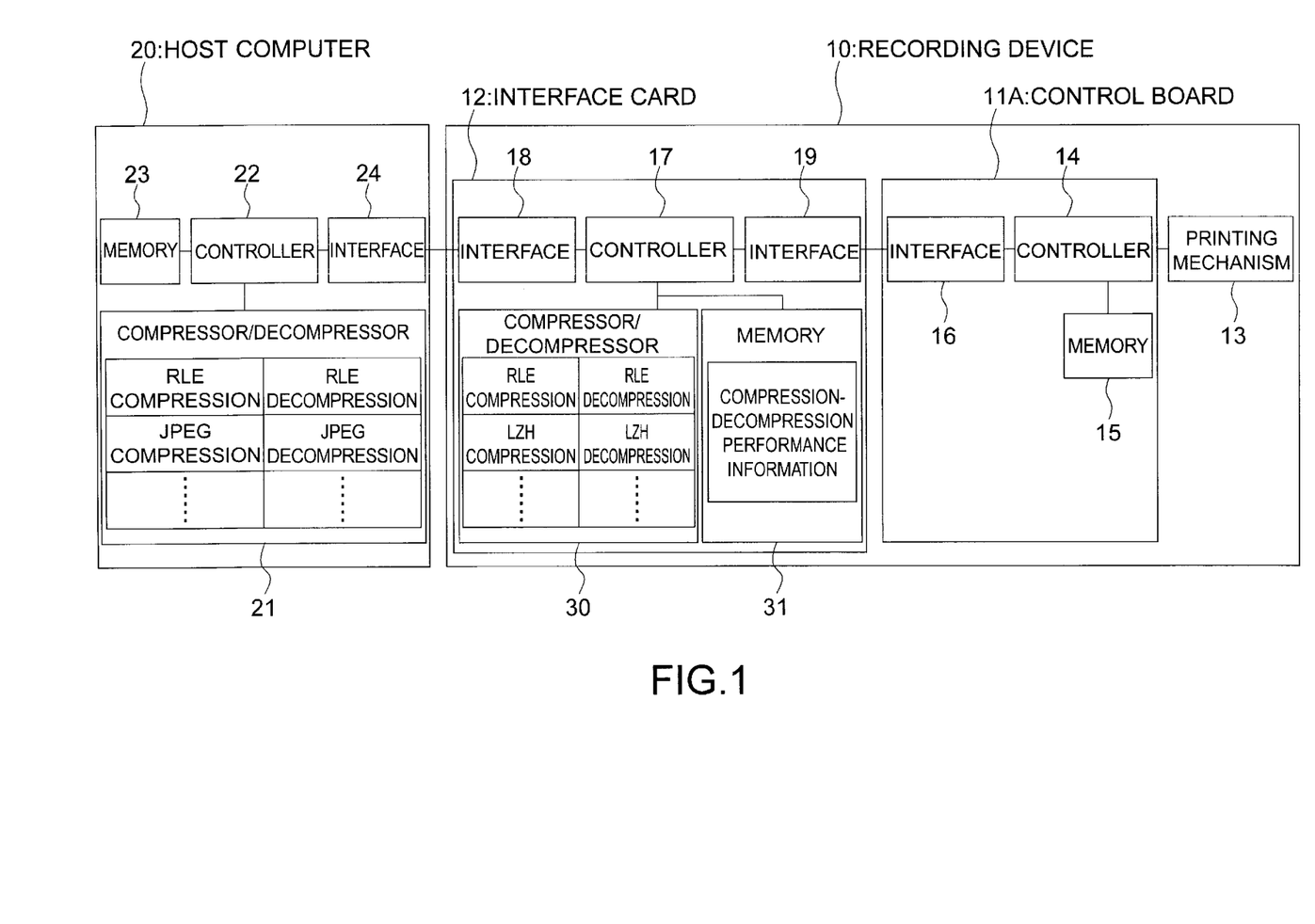
FIG. 1 is a block diagram of the recording device of the first embodiment of the present invention.

Referring to drawings, embodiments of the present invention are described as follows. FIG. 1 is a block diagram of the recording device of an embodiment of the present invention. In FIG. 1, the host computer 20 connected to the recording device 10 is also shown. The recording device 10 basically comprises printing mechanism part 13, such as paper feed mechanism and other mechanical parts, a control board 11A for providing overall control of the recording device, and an interface card 12.

The interface card 12 is a board on which is mounted all circuitry for performing functions relating to communication between the recording device and the host computer, in order to form a single, replaceable unit. Accordingly, by replacing the interface card 12, it is possible to adapt to various interfaces, such as RS232C, Centronics or USB (Universal Serial Bus), between the various host computers and the recording device.

All functions in the recording device 10, except those contained in the interface card 12 and the printing mechanism part 13, are mounted in the control board 11A. That is, the control board 11A contains controller 14 for controlling the printing mechanism part 13, memory 15 comprised of ROM stored with program data, font data, etc. and RAM for temporarily storing printing data, control commands and other information, and interface 16 for communication with the interface card 12.

The replaceable interface card 12 is detachably connected to the control board. For example, the interface card may be inserted into and removed from a card slot in a main backplane and connected to the control through backplane connections, or if backplane connections are not available the interface card and control board may be connected by a wire cable.

The interface card 12 includes a compressor and decompressor 30, controller 17 for controlling the card, interface 18 for communicating with the host computer 20, and interface 19 for communicating with the control board 11A. While several interface standards like RS232C, Centronics and USB may be provided on the same interface card 12 and selectively used, it is preferable to provide multiple interface cards, each for a respective interface standard. In this latter case, the card with the interface standard required for connection to a particular host computer will be installed in the printer.

The compressor and decompressor 30 mounted in the interface card 12 provides functions for decompressing and/or compressing of data, including printing data and control commands exchanged with the host computer 20. That is, the compressor and decompressor 30 decompresses (restores) compressed data sent from the host computer 20 to original data through its decompressing function, and it compresses data sent to the host computer 20 from the recording device 10 through its compressing function.

The compressor and decompressor 30 uses standard data compression-decompression algorithms, such as run-length coding, Huffman coding, discrete cosine transformation, Lempel-Ziv (LZ) coding, JPEG, etc. As shown in FIG. 1, it contains a plurality of different compression and decompression algorithms to allow interface card 12 to perform data compression and decompression that is compatible with the algorithm used by the host computer 20.

The compressor and decompressor 30 must be able to decompress data that is sent to the recording device after having been compressed by the compressor and decompressor 21 in the host computer 20. Also, the compressor and decompressor 21 in the host computer 20 must decompress data sent to the host computer after having been compressed by the compressor and decompressor 30. Due to this compatibility requirement, the compression-decompression algorithm in the interface card 12 must support at least one of the compression-decompression algorithms of the compressor and decompressor 21 in the host computer 20.

A memory 31 of the interface card 12 is provided with compression/decompression performance information. That is, in this embodiment, memory 31 stores a table including information such as the types of printers (control boards) to which the interface card can connect, the types of compression/decompression algorithms supported by each of the printers, and the types of compression/decompression algorithms supported by the interface card 12 itself.

Controller 17 reads such information stored in memory 31. Controller 17 also may require controller 14 of control board 11A to read and transmit such information, if any, stored in memory 15. Based on such information, controller 17 knows whether a compression/decompression function is implemented on control board 11A and, if it is, what algorithms are supported. In this embodiment, the algorithm used for the exchange of data between the host computer 20 and the recording device is selected from algorithms supported in both the interface card 12 and host computer 20, because control board 11A does not support any compression/decompression functions.

In the sequence of transmitting compressed data from the host computer 20 to the recording device 10, prior to generation of the compressed data, a dialogue is conducted between the host computer 20 and the interface card 12 of the recording device 10 to determine a compatible compression-decompression algorithm that can be used in the operation. Using a compatible coding system for data compression ensures that the recording device 10 will be able to decompress the compressed data.

Also, in the sequence of transmitting compressed data from the recording device, a dialogue is first conducted with the host computer 20 to ensure that the data is compressed by a coding system that is compatible with a decompression algorithm in the host computer 20. When the same algorithm is used for the uplink from the recording device 10 to the host computer 20 as the downlink from the host computer 20 to the recording device 10, the dialogue needs to be conducted only once.

Figure 3:
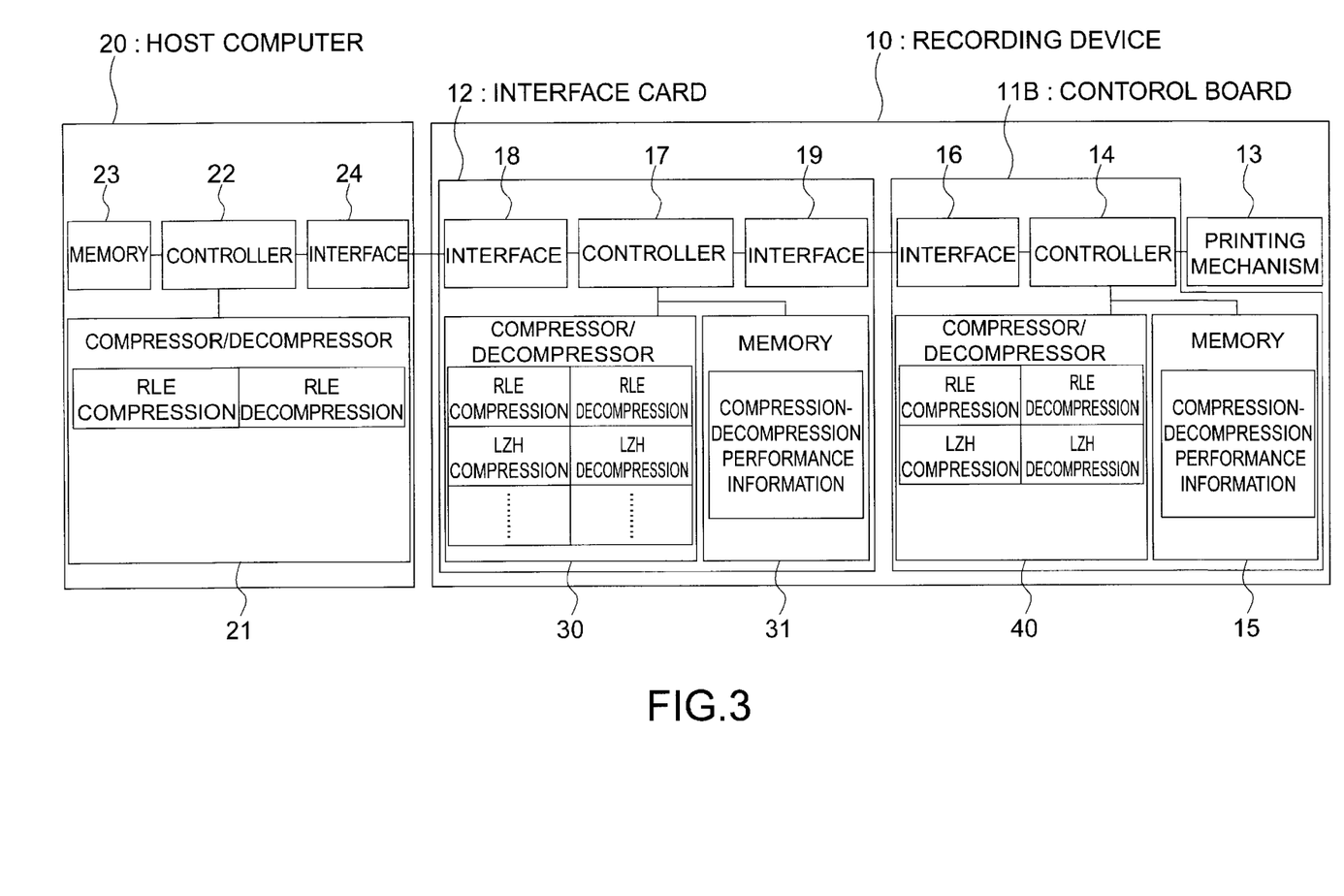
FIG. 3 is a block diagram of the recording device of the second embodiment of the present invention.

A recording device of another embodiment of the present invention is described as follows. FIG. 3 is a block diagram of the recording device of this embodiment of the present invention. In describing the present embodiment, the same component parts as in the previous embodiment use the same reference numbers and their description is the same as discussed above. The present embodiment is different from the previous in that the control board 11B further contains compressor and decompressor 40, and both memories 15 and 31 of the control board 11B and interface card 12, respectively, contain compression-decompression performance information.

In this embodiment, the compressor and decompressor 40 provided in the control board 11B supports at least one of a plurality of compression-decompression algorithms contained in the compressor and decompressor 30 provided in the interface card 12. That is, data compressed by any algorithm supported in both compressor and decompressor 30 and 40 can be decompressed by using either of the compressor and decompressor 30 or 40. Also, data compression by such algorithm is possible by using either of the compressor and decompressor 30 or 40.

Each of memories 15 and 31 of the control board 11B and interface card 12, respectively, stores compression-decompression performance information. The compression-decompression performance information is one or more types of numerical information indicating processing performance on data compression and decompression of each of the compressor and decompressor 30 and 40. That is, stored in the memory 15 is information regarding data processing performance of the compressor and decompressor 40 mounted in the control board 11B, and stored in the memory 13 is data processing performance of the compressor and decompressor 30 mounted in the interface card 12.

The performance information stored in the memories 31 and 15 includes, for example, the types of algorithms supported by each of compressor and decompressor 30 and 40, data compression ratios of each algorithm, amount of data processing required for compression and decompression per byte of each algorithm, compression and decompression block size, transfer rate between interface card 12 and control board 11B, and throughput of each controller 17 and 14, etc. The transfer rate between the interface card 12 and control board 11B and the throughput of the controllers 17 and 14 may be stored in both memories 15 and 31, or in just one, or information about each controller may be stored in a respective memory. The transfer rate is preferably stored in memory 15 and the throughputs of controllers 14 and 17 are preferably stored in memories 15 and 31, respectively. It will be understood, that in the latter case controller 17 obtains information about the transfer rate and the throughput of controller 14 by sending an inquiry to controller 14.

If the compressor and decompressor 30 or 40 supports a plurality of compression-decompression algorithms, each of the memories can store performance information for each of the algorithms.

In the present embodiment, the program executed in the controller 17 of the interface card 12 carries out the performance comparison function for comparing performance information stored in each of the memories 15 and 31.

The performance comparison function carried out in the controller 17 compares not only the performance of the two compressors and decompressors 30 and 40 themselves, but also the total performance for compressing/decompressing data between the control board 11B and interface card 12, e.g. taking into account the data transfer rate therebetween.

That is, the controller 17 reads out compression-decompression performance information from each of the memories 15 and 31, compares them and enables the one compressor and decompressor with the higher performance, and disables the other.

For example, as a result of comparison, if the interface card 12 is determined to have higher performance for compressing/decompressing data than control board 11B, then the compressor and decompressor 30 in the interface card 12 is enabled to execute compression and decompression of data exchanged between the host computer and the recording device. The above comparison of performance may be conducted only for the first time that data compression and decompression is required, e.g. when the interface card 12 is replaced, and the result may then be stored in a non-volatile memory. In such case, the performance comparison need only be performed once.

Next, with reference to the flowcharts in FIGS. 2, and 4 to 6, the following describes the procedures for executing printing in the recording device 10 by sending printing data and control commands from the host computer 20 to the recording device 10.

Figure 2:
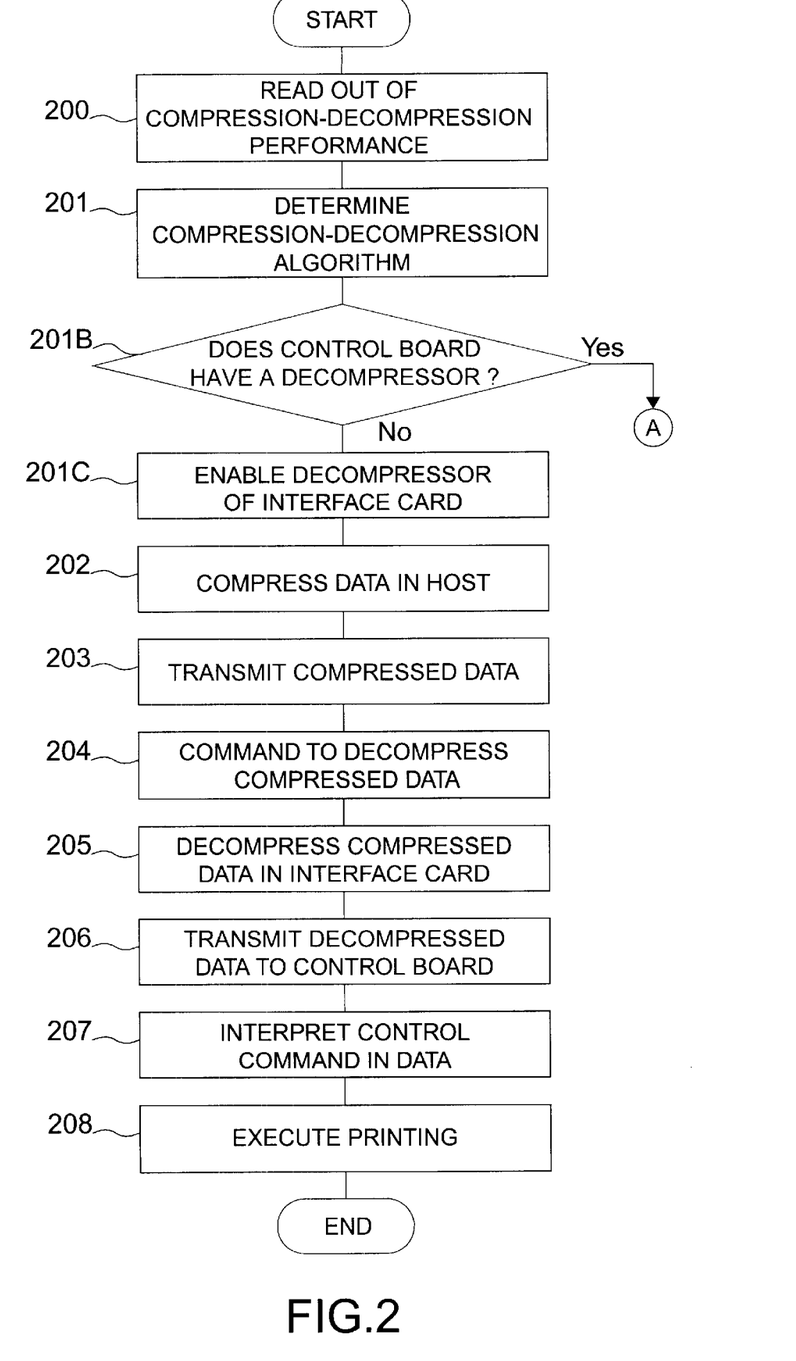
FIG. 2 is a flow chart showing procedures to execute printing through the transmission of data from the host computer to the recording device.

To start, the controller 17 of the interface card 12 reads compression-decompression performance information out of the memories 15 and 31, respectively (step 200).

Before transmitting printing data and control commands to the recording device 10, the controller 22 of the host computer 20 negotiates with the controller 17 of the interface card 12 of the recording device to determine which compression-decompression algorithm is supported by the two devices (step 201). For example, in FIG. 3, the RLE compression algorithm is determined.

The algorithm with the highest compression ratio is selected out of those supported by compressor and decompressor 21 and at least one of compressors and decompressors 30 and 40.

In the interface card 12, the controller 17 determines whether or not the control board 11 (11B) supports the determined algorithm (step 201B). If it is not available, as shown in the embodiment illustrated in FIG. 1, or an existing compression/decompression unit does not support the algorithm determined in step 201, the controller 17 enables compressor and decompressor 30 to decompress compressed data sent from the host computer 20 (step 201C).

Data to be sent is compressed by the compressor and decompressor 21 of the sending side (host computer 20) using the previously determined algorithm (step 202). Upon completion of data compression, the controller 22 sends compressed data to the recording device through the interface 24 (step 203).

In the recording device 10, the controller 17 of the interface card 12 generates a command (step 204) and issues it to the compressor and decompressor 30 to decompress the compressed data received through the interface 18. According to the command, the compressor and decompressor 30 executes decompression of the compressed data (step 205) in accordance with the algorithm previously determined in the negotiation between the host and interface card.

Next, decompressed data is transmitted to the control board 11 through interface 19 (step 206). The controller 14 of the control board 11 interprets the control command contained in the decompressed data (step 207) and executes printing in accordance with the decompressed data (step 208).

Figure 4:
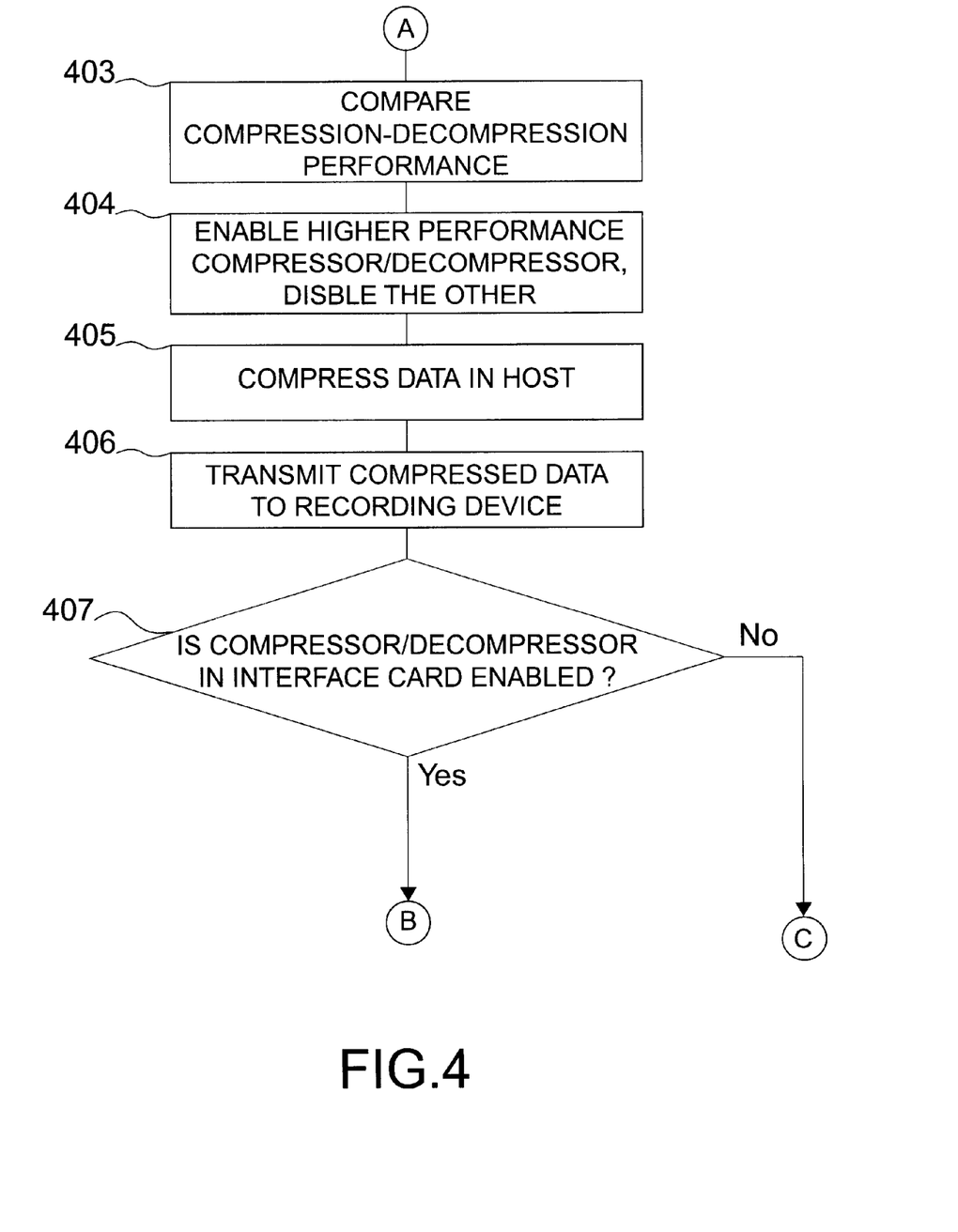
FIG. 4 is a flow chart showing procedures to execute printing through transmission of data from the host computer to the recording device showing steps up to the comparison of compression-decompression performance.

Alternatively, in the step 201B, if the control board 11 (11B) supports the determined algorithm, as shown in the embodiment illustrated in FIG. 3, the controller 17 compares performances for decompressing data between the control board 11B and interface card 12 (step 403). This comparison refers to the information read out of the memories 15 and 31 in the previous step 200.

As a result of the comparison, the controller 17 enables whichever one of the compressors and decompressors 30 and 40 that achieves the higher performance, and disables the other (step 404). For example, compressor and decompressor 30 is enabled, and compressor and decompressor 40 is disabled. Controller 17 enables or disables compressor and decompressor 40 by instructing controller 14 to do the required enabling or disabling.

In the host computer 20, data compression is executed by a run length coding (RLE) algorithm (step 405) to send compressed data to the recording device 10 through the interface 24 (step 406).

In the recording device 10, the controller 17 of the interface card 12 determines whether or not the function of its own compressor and decompressor 30 is enabled (step 407). If it is enabled, a command is given to the compressor and decompressor 30 to decompress the received compressed data (step 501 in FIG. 5).

Figure 5:
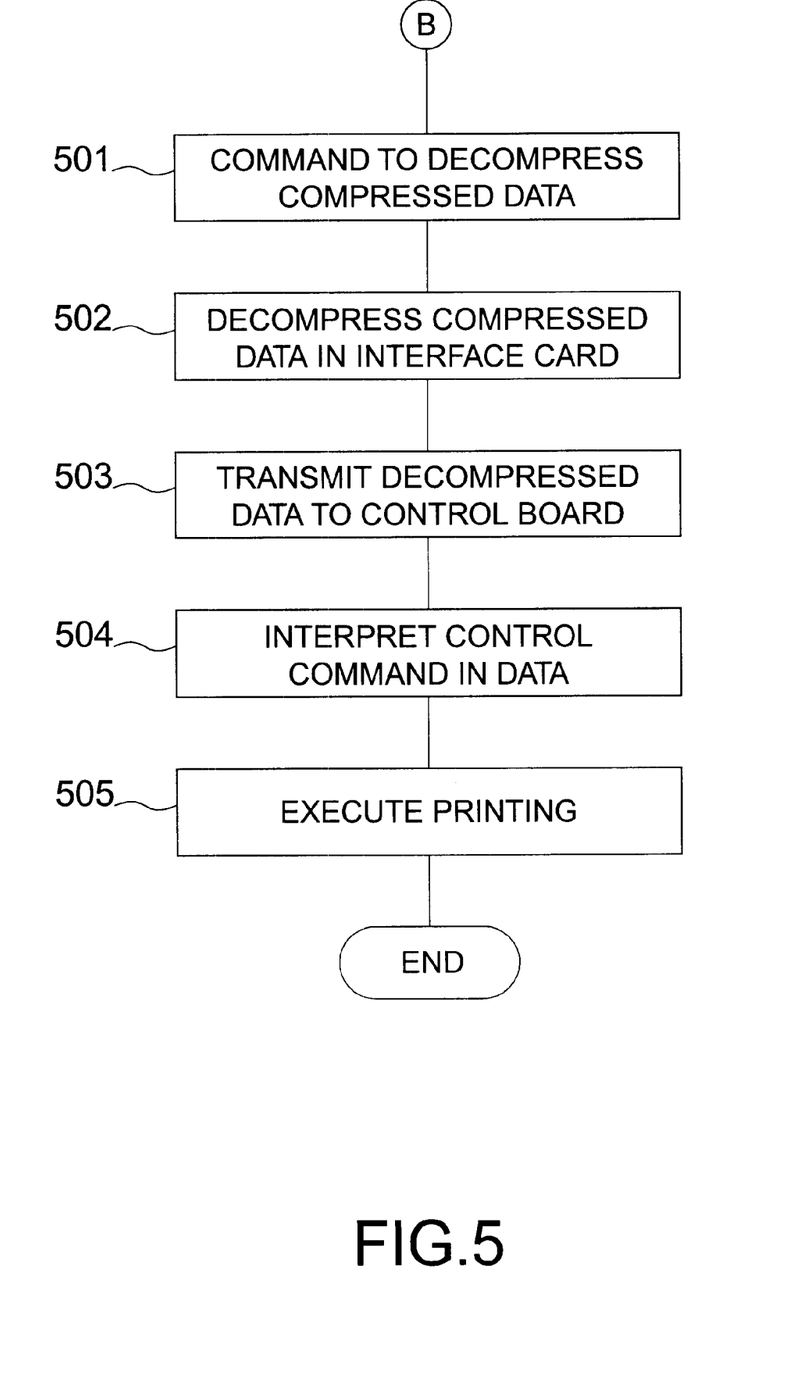
FIG. 5 is a flow chart showing procedures to execute printing through transmission of data from the host computer to the recording device showing steps of decompression of the compressed data in the interface card.

In accordance with the command, the compressor and decompressor 30 decompresses the compressed data (step 502). Then, the decompressed data is transmitted to the control board 11B through interface 19 (step 503). The controller 14 of the control board 11B interprets the command contained in the decompressed data (step 504) to execute printing in accordance with the decompressed data (step 505).

Figure 6:
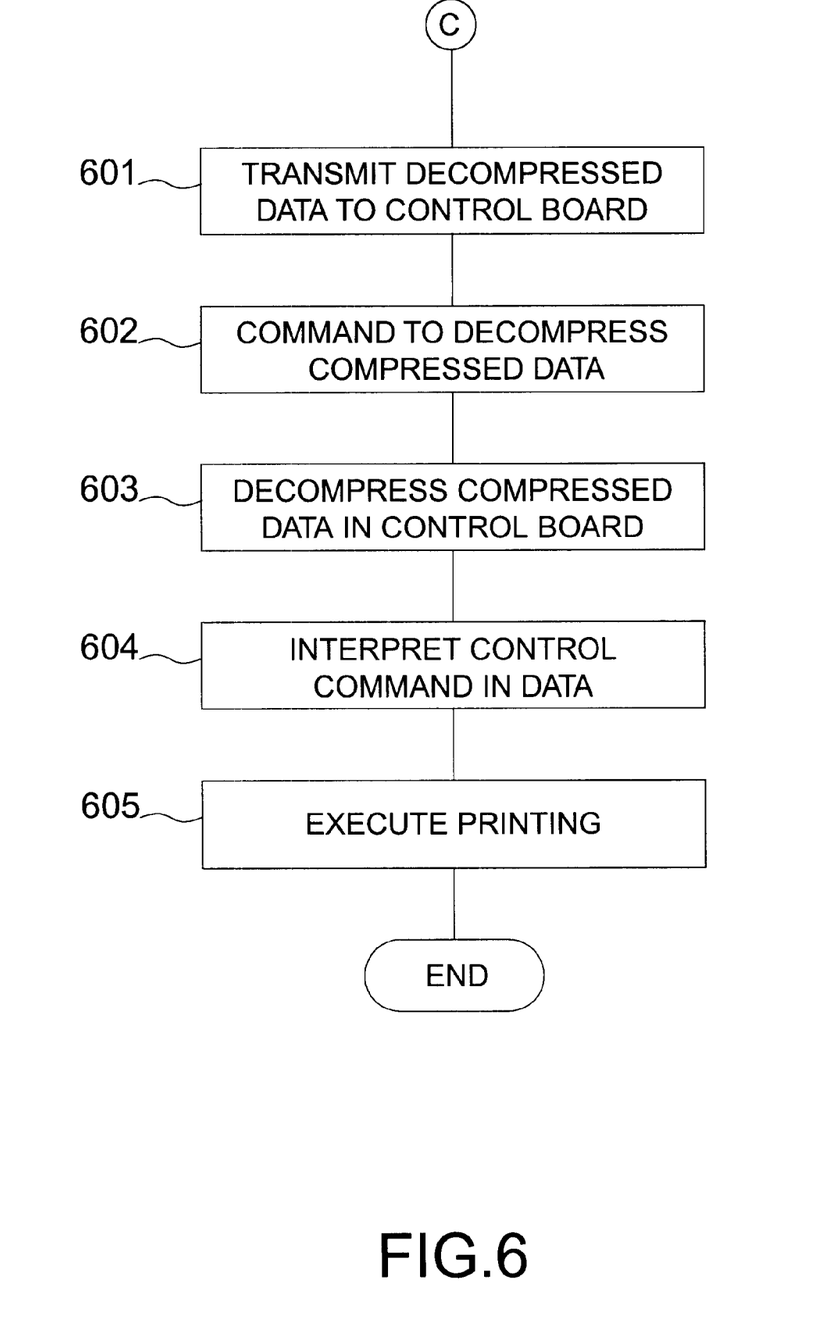
FIG. 6 is a flow chart showing procedures to execute printing through transmission of data from the host computer to the recording device showing steps of decompression of the compressed data in the control board of the recording device.

Alternatively, in the step 407, if the compressor and decompressor 30 of the interface card 12 is not enabled, the controller 17 transfers the compressed data in its compressed form to the control board 11B through interface 19 (step 601 in FIG. 6). The controller 14 of the control board 11B issues a command to decompress the received compressed data after confirming that its own compressor and decompressor 40 is enabled (step 602). In accordance with the command the compressor and decompressor 40 decompresses the compressed data (step 603). Then, the controller 14 interprets the command contained in the decompressed data (step 604) and executes printing in accordance with the decompressed printing data (605).

As described above, compression and decompression of data in the optimum manner is always achieved by comparing performance of both of the compressors and decompressors and then executes data compression and decompression using the one with higher performance. This selection of the higher performance compression and decompression function occurs even if performance of the interface card 12 is changed due to replacement of the card.

If the transfer rate between the interface card and the control board of the recording device is comparatively low, it is more desirable to transmit smaller amounts of data between them.

Accordingly, in processing compressed data from the host computer, there may be a situation where better performance of the recording device as a whole is achieved by transferring compressed data with a smaller data amount between the interface card and the control board of the recording device, even though the compressor and decompressor 40 of the control board 11 has a somewhat inferior performance than that of the compressor and decompressor 30 of the interface card 12.

Accordingly, it is preferable to determine which compressor and decompressor should be used by taking into account the transfer rate between the interface card and the control board.

Also, as shown in FIG. 3, if the compressors and decompressors 30 and 40 of the interface card 12 and control board 11, respectively, support an algorithm with a higher compression ratio (for example, Huffman coding) than that of the compression-decompression algorithm supported by the compressor and decompressor 21 of the host computer 20 (for example, run length coding), it may be preferable to compress the data again in the interface card 12 before transferring it to the control board 11. That is, the data compressed by run length coding and received from the host computer 20 is first decompressed in the interface card 12, and then it is compressed by Huffman coding and transferred to the control board 11. Finally it is decompressed by the compressor and decompressor 40 of the control board 11. This is effective if the transfer rate between the interface card 12 and the control board 11 is low.

The method of the present invention as set forth in the flowcharts described above may be embodied in a computer software program that may be executed by one or more of the controllers 22, 17 and 14. This software program may be resident in one or more of the memories 23, 31 and 15 or may be stand alone and recorded on a medium such as a diskette, floppy disk, etc., or may be embodied on a carrier wave, and can be loaded into and executed by the host computer 20 and/or recording device 10 in a conventional manner.

Embodiments of the present invention are described above referring to drawings but the present invention is not limited to the matters mentioned in the above embodiment but it encompasses a scope within which a person skilled in the art can modify or adopt it based on the statements in the claims and the detailed description of the invention together with the prior art. For example, in the above embodiments, each of the memories 15 and 31 stores each of compression-decompression performance information but both of performance information may be stored in the memory 15 or 31.

While compressors and decompressors 30 and 40 have been described as units capable of compressing and decompressing, the compressing function is not always necessary for the interface card 12 and/or the control board 11. Typically, the amount of data sent from the printer to the host computer is small compared to the amount of data sent in the opposite direction. There may be cases, however, where a higher amount of data needs to be sent to the host computer, so that compressing these data on the printer/interface board side could improve the overall throughput. This may, for instance, be the case where a scanner is integrated with the printer Advantage The present invention, as disclosed above, allows the compression-decompression function provided in the recording device to be easily replaced and still be compatible with the compression-decompression function provided in the host computer. This provides a recording device that can easily function with a host computer having various compression-decompression functions.

Also, in the present invention, the data compressor and decompressor mounted in the control board of the recording device is compared in performance with that of the compressor and decompressor of the interface card. This achieves a reduction in the time length required for data processing by executing decompression or compression of data using whichever one of the compressors and decompressors that is more favorable for decompression or compression of data. The present invention is especially beneficial if the interface card is replaced and performance of the compressor and decompressor mounted in it is changed.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A recording device connected to a host computer, said host computer compressing data to be recorded by the recording device and sending the compressed data to said recording device, said recording device comprising:

a control board having a first controller for controlling said recording device; and an interface card detachably connected to said control board, said host computer communicating with said first controller via said interface card;

said interface card comprising:

a first decompressor for decompressing the compressed data received from said host computer;

a second controller that compares a data processing performance for decompressing the compressed data of said control board to a data processing performance for decompressing the compressed data of said interface card and controls said first decompressor to decompress the compressed data.

2. A recording device according to claim 1, wherein said control board comprises a second decompressor board, and wherein said second controller enables one of said first and second decompressors to decompress the compressed data after comparing the data processing performance for decompressing the compressed data of said control board to the data processing performance for decompressing the compressed data of said interface card.

3. A recording device according to claim 1, wherein said first decompressor comprises a plurality of different algorithms for decompressing said compressed data.

4. A recording device according to claim 1, wherein said interface card comprises a first compressor that compresses data to be sent to at least one of said host computer and said control board.

5. A recording device according to claim 4, wherein said control board comprises a second compressor that compresses data to be sent to at least one of said host computer and said interface card.

6. A recording device according to claim 5, wherein said second controller enables one of said first and second compressors to compress the data after comparing the data processing performance for compressing the data of said control board to the data processing performance for compressing the data of said interface card.

7. An interface card for communicating with a recording device and a host computer, said interface card detachably connected to a control board of said recording device, said control board having a first controller for controlling said recording device, said interface card comprising:

a first decompressor for decompressing compressed data received from said host computer;

a second controller that compares a data processing performance for decompressing the compressed data of said control board to a data processing performance for decompressing the compressed data of said interface card and controls said first decompressor to decompress the compressed data.

8. An interface card according to claim 7, wherein said second controller enables one of said first decompressor and a second decompressor on said control board to decompress the compressed data after comparing the data processing performance for decompressing the compressed data of said control board to the data processing performance for decompressing the compressed data of said interface card.

9. An interface card according to claim 7, wherein said first decompressor comprises a plurality of different algorithms for decompressing said compressed data.

10. An interface card according to claim 7, wherein said interface card comprises a first compressor that compresses data to be sent to at least one of said host computer and said control board.

11. An interface card according to claim 10, wherein said second controller enables one of said first compressor and a second compressor on said control board to compress the data after comparing the data processing performance for compressing the data of said control board to the data processing performance for compressing the data of said interface card.

12. An interface card according to claim 7, wherein said first compressor comprises a plurality of different algorithms for compressing the data.

13. A method for sending recording data from a host computer to a recording device, wherein an interface card having a first decompressor is detachably connected to a control board mounted in the recording device, and the host computer communicates with the control board via the interface card; comprising the steps of;

(a) determining an algorithm for compressing and decompressing recording data that is supported by the host computer and at least one of the interface card and the control board;

(b) enabling the first decompressor if the control board has no decompressor that can decompress compressed data in accordance with the algorithm determined in the step (a);

(c) if the control board has a second decompressor that can decompress the compressed data, then comparing a data processing performance for decompressing the compressed data of the control board to a data processing performance for decompressing the compressed data of the interface card;

(d) in accordance with the result of step (c), enabling one of the first and second decompressors;

(e) compressing the recording data in the host computer in accordance with the algorithm determined in the step (a), and sending the compressed data to the interface card;

(f) if the first decompressor is enabled, decompressing the compressed data in the interface card, and sending the decompressed data to the control board; and (g) if the first decompressor is disabled, passing the compressed data to the control board; and decompressing the compressed data therein.

14. A computer readable medium embodying a program of instructions for execution by a machine to perform a method for sending recording data from a host computer to a recording device, wherein an interface card having a first decompressor is detachably connected to a control board mounted in the recording device, and the host computer communicates with the control board via the interface card; comprising the steps of:

(a) determining an algorithm for compressing and decompressing recording data that is supported by the host computer and at least one of the interface card and the control board, (b) enabling the first decompressor if the control board has no decompressor that can decompress compressed data in accordance with the algorithm determined in the step (a);

(c) if the control board has a second decompressor that can decompress the compressed data, then comparing a data processing performance for decompressing the compressed data of the control board to a data processing performance for decompressing the compressed data of the interface card;

(d) in accordance with the result of step (c), enabling one of the first and second decompressors;

(e) compressing the recording data in the host computer in accordance with the algorithm determined in the step (a), and sending the compressed data to the interface card;

(f) if the first decompressor is enabled, decompressing the compressed data in the interface card, and sending the decompressed data to the control board; and (g) if the first decompressor is disabled, passing the compressed data to the control board; and decompressing the compressed data therein.

* * * * *